(12) United States Patent
Gallagher et al.

(10) Patent No.: US 6,408,103 B1
(45) Date of Patent: Jun. 18, 2002

(54) METHOD FOR PRESERVING SPATIAL DETAIL AND COLOR CONTENT WHEN ADJUSTING THE TONE SCALE OF A DIGITAL COLOR IMAGE

(75) Inventors: Andrew C. Gallagher; Edward B. Gindele, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/224,007

(22) Filed: Dec. 31, 1998

(51) Int. Cl.[7] .................................................. G06K 9/40
(52) U.S. Cl. ...................... 382/260; 382/263; 382/264; 382/167; 358/520
(58) Field of Search .................................. 382/162, 167, 382/260, 263, 264; 358/515, 518, 520, 521

(56) References Cited

U.S. PATENT DOCUMENTS

| | | | |
|---|---|---|---|
| 5,012,333 A | 4/1991 | Lee et al. .................... 358/80 |
| 5,446,504 A | 8/1995 | Wada .......................... 348/645 |
| 5,638,138 A | 6/1997 | Hickman ..................... 348/678 |

OTHER PUBLICATIONS

J. A. Stephen Viggiano and C. Jeffrey Wang, 1992 TAGA Proceedings: *A Comparison Of Algorithms For Mapping Color Between Media Of Differing Luminance Ranges*, pp. 959–974.

*Primary Examiner*—Tommy Lee
(74) *Attorney, Agent, or Firm*—David M. Woods (57) ABSTRACT

A method for preserving spatial detail and color content is performed when adjusting the tone scale of a digital color image. This method comprises the steps of receiving a digital color image, providing a tone scale function for adjusting the tone scale of the digital color image; providing a spatial filter for adjusting the tone scale of the digital color image; transforming the digital color image into a luminance signal and chrominance signals; using the tone scale function, the spatial filter, and the luminance signal to produce an enhanced luminance signal; and using the tone scale function, the spatial filter, the luminance signal, and the chrominance signals to produce enhanced chrominance signals.

12 Claims, 10 Drawing Sheets

(system diagram)

METHOD FOR PRESERVING SPATIAL DETAIL AND COLOR CONTENT WHEN ADJUSTING THE TONE SCALE OF A DIGITAL COLOR IMAGE

FIELD OF THE INVENTION

The invention relates generally to the field of digital color image processing and, more particularly, to a method for preserving image spatial detail and color content when adjusting the tone scale of a digital color image.

BACKGROUND OF THE INVENTION

Existing methods for applying tone scale functions to digital color images include transforming the original digital color image into a luminance-chrominance representation and applying the tone scale function to the luminance channel while preserving the color difference signals. These methods of tone scale function application alter the sharpness and color appearance characteristics of the processed images.

In U.S. Pat. No. 5,012,333, Lee et al. described a method for applying a tone scale function to a digital color image with goal of preserving the spatial detail information. This method proposed separating the digital image into high spatial frequency and low spatial frequency components by using FIR filters. The tone scale function is then applied to only the low spatial frequency component of the original image. The final processed image is produced by adding the high spatial frequency component back to the tone scaled low spatial frequency component. Additionally, the method described in U.S. Pat. No. 5,012,333 involves transforming the original digital color image into a luminance-chrominance representation, applying the tone scale function to the luminance component with a spatial filtering technique, and preserving the chrominance components.

If the luminance contrast is modified and the chrominance contrast is preserved, the color saturation characteristics of the resulting processed image may appear artificial and unnatural. In an effort to address this problem, Viggiano and Wang proposed (1992 TAGA Proceedings: *A Comparison of Algorithms for Mapping Color Between Media of Differing Luminance Ranges,* pp. 959–974) a method of scaling the chroma signal of a digital color image by a factor midway between unity and the ratio of the L* range of the reproduction and the original. However, this solution does not anticipate tone scale functions that vary the level of compression dependent upon the intensity of the input. Thus, a single factor that scales the chroma signal of the input image is inappropriate for a wide range of possible tone scale functions.

In addition, in U.S. Pat. No. 5,446,504, Wada describes a method to correct color saturation when compressing the dynamic range of an image. However, this method once again determines the correction factor based upon the relationship of the input image dynamic range and the output image dynamic range.

In addition, in U.S. Pat. No. 5,638,138, Hickman describes a method of modifying the luminance signal of an input image, then "multiplying the color components by a transfer ratio of modified luminance to unmodified luminance to obtain modified color components." However, this method again does not consider that a tone scale function may consist of several ranges of varying level of contrast compression or enhancement.

The application of a tone scale function using spatial filtering techniques to a luminance signal representation of a digital color image described in U.S. Pat. No. 5,012,333 does preserve spatial detail in the processed image. However, while the spatial detail of the processed image is improved with this method, the color characteristics of the processed images can be affected. In addition, the size of the spatial filter used must be selected to achieve optimal results. Combining a spatial filtering method of applying a tone scale function to the luminance signal and the chrominance signal modification is natural. The processed images with the combination of these methods produces images with both improved spatial detail and more natural color characteristics.

The method of applying a tone scale function to a digital color image with spatial filtering techniques affects the color characteristics. In particular, the size of the spatial filter used in the tone scale function application affects the color characteristics. None of the methods described in the prior art involves the modification of the image chrominance characteristics based upon the method of spatial processing used to apply a tone scale function to the luminance signal.

There exists an inverse relationship between the size of the spatial filter used to apply a tone scale function to the luminance signal and the degree to which the chrominance signals should be modified. Thus a need exists for a method that coordinates the modification of the chrominance signals and the luminance signal while applying a tone scale function to a digital color image.

SUMMARY OF THE INVENTION

The object of the present invention is directed to providing an improved method for preserving spatial detail and color content when adjusting the tone scale of a digital color image. Briefly summarized, according to one aspect of the present invention, the invention resides in the steps of: (a) receiving a digital color image; (b) providing a tone scale function for adjusting the tone scale of the digital color image; (c) providing a spatial filter for adjusting the tone scale of the digital color image; (d) transforming the digital color image into a luminance signal and chrominance signals; (e) using the tone scale function, the spatial filter, and the luminance signal to produce an enhanced luminance signal; and (f) using the tone scale function, the spatial filter, the chrominance signals, and the chrominance signals to produce enhanced chrominance signals.

ADVANTAGEOUS EFFECT OF THE INVENTION

The present invention has the advantage of preserving spatial detail and color content while altering the tone scale of a digital color image. A key element of the present invention is the coordination of the chrominance modification and the luminance modification based on the characteristics of a digital filter.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
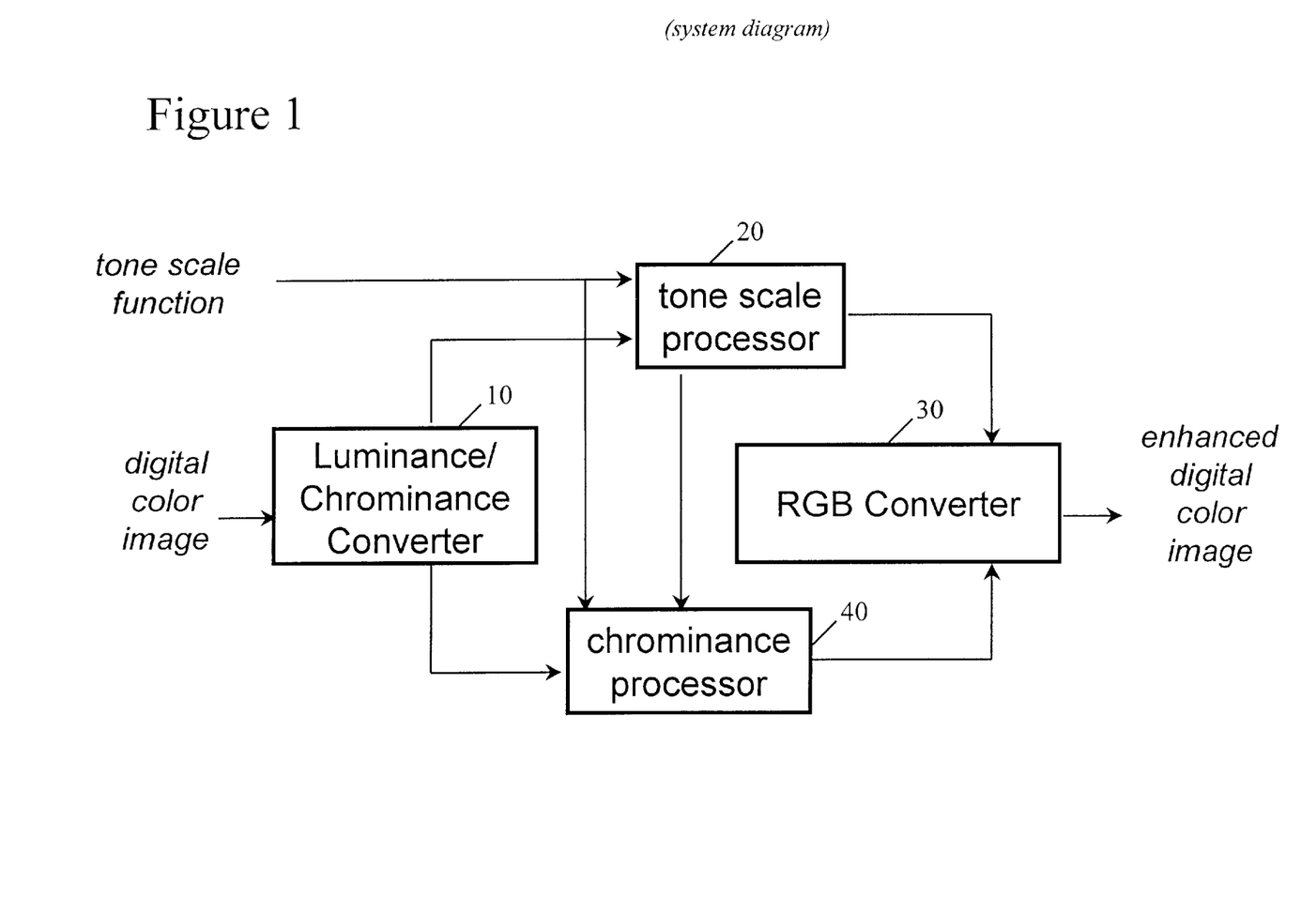
FIG. 1 is a block diagram illustrating an overview of the present invention.

Referring to FIG. 1, there is illustrated a functional block diagram of the present invention. The present invention utilizes a digital color image consisting of a collection of digital image channels, each corresponding to a unique color. The most common implementation of digital color images includes three digital image channels (red, green, and blue). Each digital image channel consists of a two-dimensional array of pixel values corresponding to light intensities.

A luminance signal is calculated from the digital image channels of the digital color image by the luminance/chrominance converter 10. More than one method exists to produce a luminance signal from a multi-color image representation. The preferred embodiment uses a linear combination of the individual color digital image channel pixel values to produce the luminance signal pixel value.

$$Z_{ij} = \Sigma_k \alpha_k P_{kij}$$

The term $Z_{ij}$ refers to the luminance value at the spatial coordinates represented by indices i and j. The term $P_{kij}$ refers to the pixel value at the same spatial coordinate for the $k^{th}$ color image channel. The term $\alpha_k$ refers to the weighting factor for the $k^{th}$ color image channel. The preferred embodiment uses $\alpha_k$ values of 0.25, 0.50, and 0.25 respectively for the red, green, and blue image channels weighting factors.

The chrominance signals are calculated by the luminance/chrominance converter 10 shown in FIG. 1. More than one method exists to produce chrominance signals from a multi-color image representation. The preferred embodiment uses a linear combination of the individual color digital image channel pixel values to produce two chrominance signal pixel values. The first chrominance signal, herein will be represented by $C_1$ is produced by using linear weights of −0.25, 0.50, and −0.25 for the red, green, and blue digital image channel weighting factors. The second chrominance signal, herein will be represented by $C_2$, is produced by using linear weights of −0.50, 0.00, and 0.50 for the red, green, and blue digital image channel weighting factors.

Referring to FIG. 1, the luminance signal produced by the luminance/chrominance converter 10 and a tone scale function are input to the tone scale processor 20. The two chrominance signals produced by the luminance/chrominance converter 10, the tone scale function, and a low pass luminance signal output from the tone scale processor 20 are input to the chrominance processor 40. The enhanced luminance signal output from the tone scale processor 20 and the two enhanced chrominance signals produced by the chrominance processor 40 are input to the RGB converter 30.

The RGB converter 30 of FIG. 1 performs the reverse operation of the luminance/chrominance converter 10 shown in FIG. 1. The RGB converter 30 produces three enhanced digital color image channels from the input enhanced luminance signal and two enhanced chrominance signals by a linear equation. The enhanced red digital image channel is produced with linear weights of 1.0, −1.0, and −1.0 for the luminance, first chrominance, and second chrominance signals respectively. The enhanced green digital image channel is produced with linear weights of 1.0, 1.0, and 0.0 for the luminance, first chrominance, and second chrominance signals respectively. The enhanced blue digital image channel is produced with linear weights of 1.0, −1.0, and 1.0 for the luminance, first chrominance, and second chrominance signals respectively.

Figure 2:
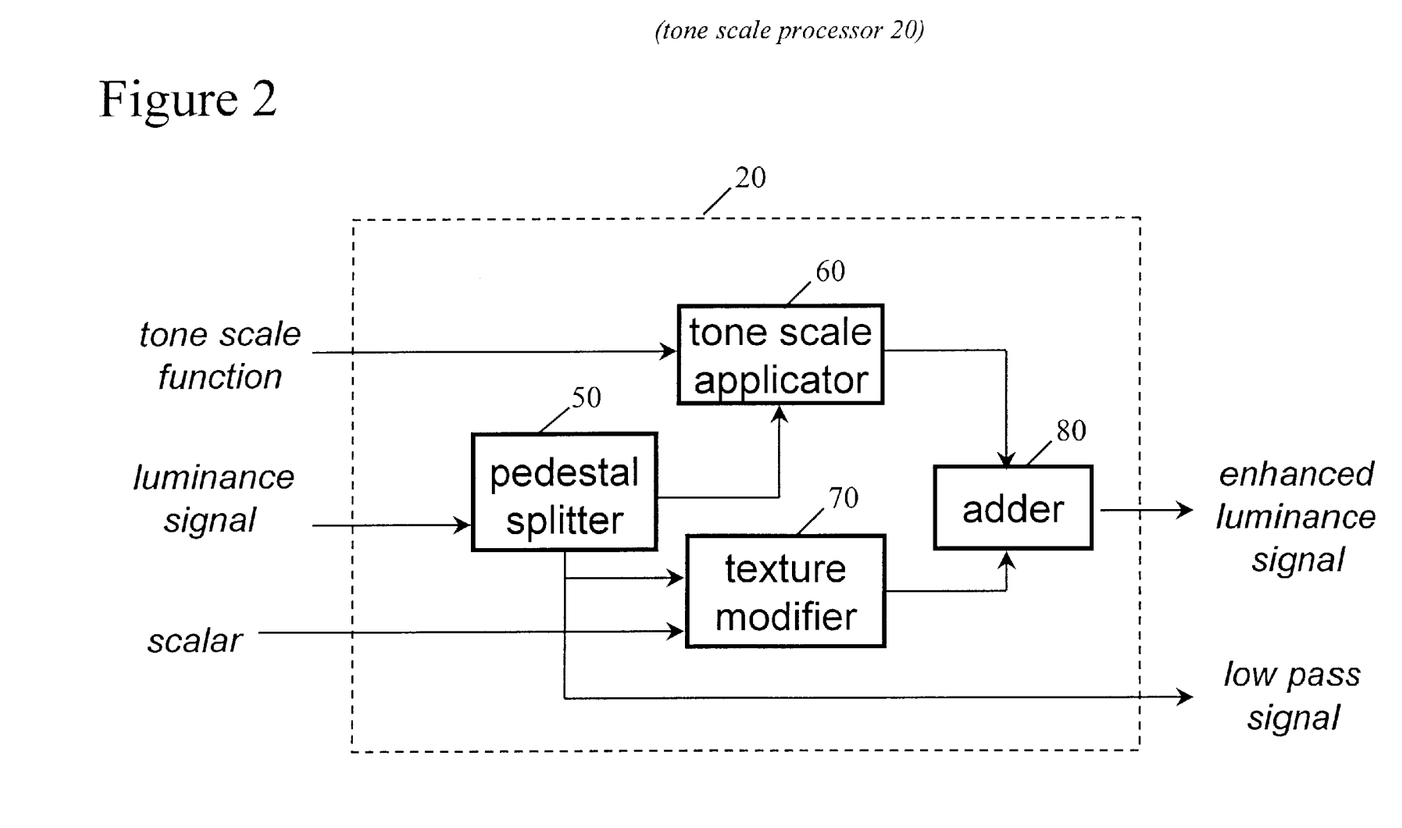
FIG. 2 is an exploded view of the tone scale processor of FIG. 1.
Figure 6:
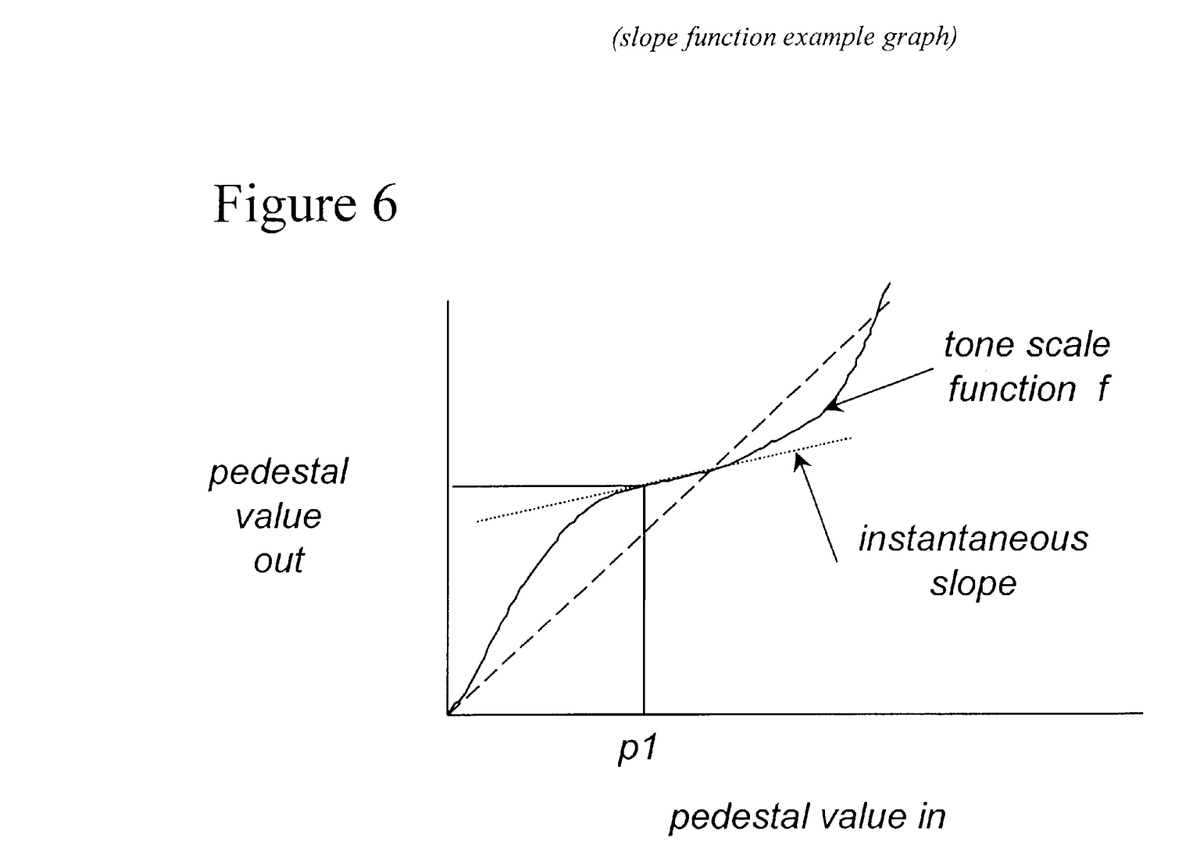
FIG. 6 is an example of a tone scale function.

Referring to FIG. 2, there is illustrated an exploded view of the tone scale processor 20 of FIG. 1. The luminance signal is then divided two signals by a pedestal splitter 50—a pedestal signal and a texture signal, as will be described in detail below. A tone scale function is applied to the pedestal signal by a tone scale applicator 60 in order to change the characteristics of the image for image enhancement. The tone scale function may be applied for the purposes of altering the relative brightness or contrast of the digital color image. A tone scale applicator 60 is implemented by the application of a look up table (LUT), as is well known in the art. An example tone scale showing a 1 to 1 mapping of input values to output values is illustrated in FIG. 6. The texture signal may be amplified by the texture modifier 70 if desired, or altered in some other manner as those skilled in the art may desire. This texture modifier 70 may be a multiplication of the texture signal by a scalar constant. The modified texture signal and the modified pedestal signal are then summed together by an adder 80, forming an enhanced luminance signal. The adder 80 performs an operation of adding the two pixel values, one from each input signal, to form the output pixel value.

Figure 3:
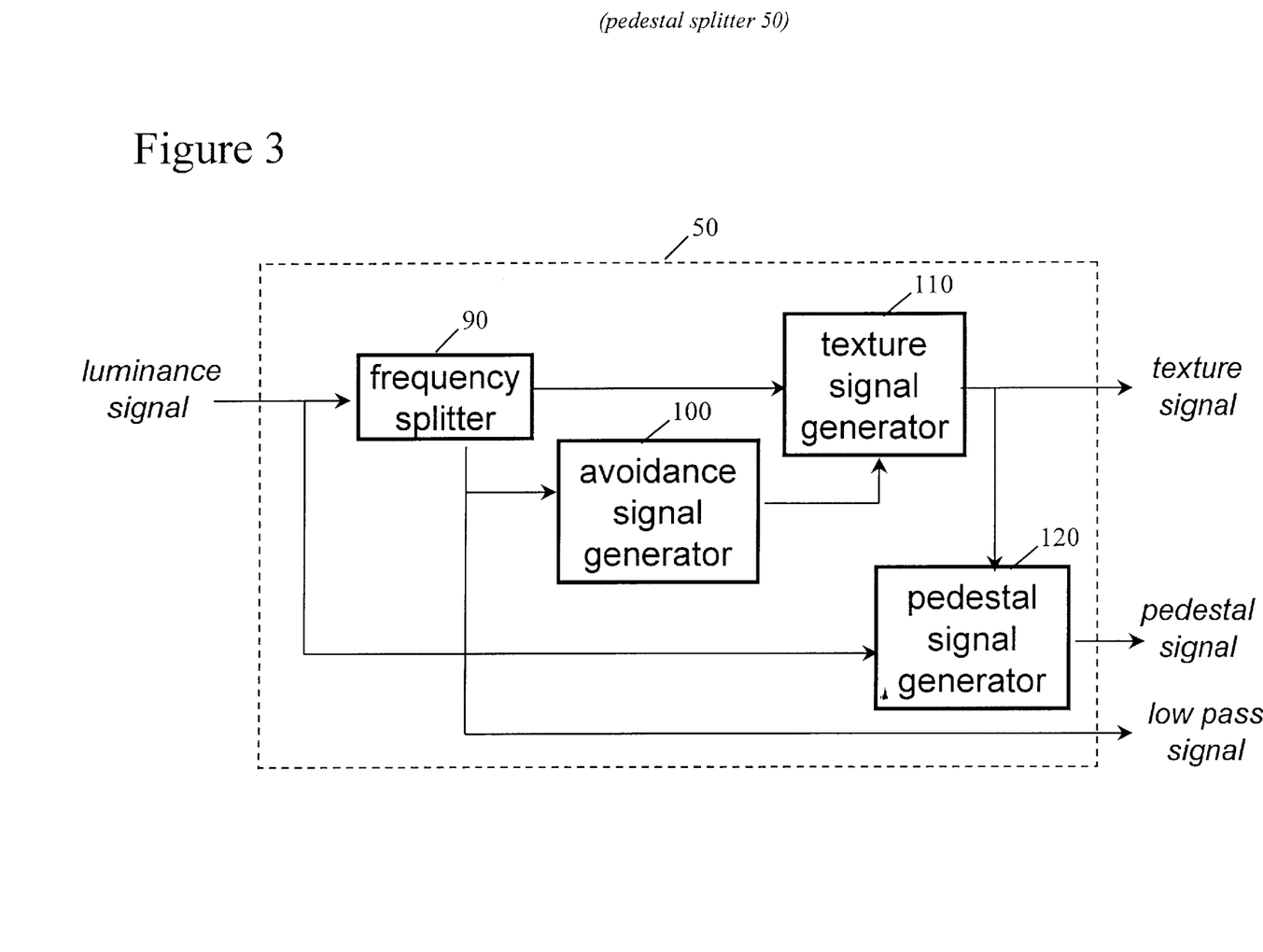
FIG. 3 is an exploded view of the pedestal splitter of FIG. 2.

Referring to FIG. 3, there is illustrated an exploded view of the pedestal splitter 50 of FIG. 2. The luminance signal input to the pedestal splitter 50 is split into a high pass signal and a low pass signal by the frequency filter 90 preferably with a Gaussian filter. The size of the spatial filter used is characterized by the standard deviation (sigma) of the Gaussian filter and is generally set to a value of 2.5 pixels. The preferred value of the standard deviation of the Gaussian filter may vary with image size. The value of 2.5 pixels for the sigma value was derived by optimizing the present invention with 1024 by 1536 pixel size images. This Gaussian filter is a two dimensional circularly symmetric low pass filter whose filter coefficients may be derived by the following formula which is well known in the art:

$$G(i,j) = 1/(\text{sigma } sqrt(2\pi))\exp[-(i^2+j^2)/(2 \text{ sigma}^2)]$$

Where
  $G(i,j)$=the Gaussian filter coefficient at the $(i, j)^{th}$ pixel
  Sigma=the standard deviation of the Gaussian filter (2.5)
  $\pi$=the constant approximately 3.1415 . . .

The low pass signal is input into an avoidance signal generator 100 for forming an avoidance signal, as will be described in detail below. In addition, the low pass signal is input to the chrominance processor 40. A texture signal generator 110 receives both the high pass signal and the avoidance signal and both signals are multiplied therein for producing a texture signal.

The pedestal generator 120 receives the luminance signal and the texture signal and subtracts the texture signal from the luminance signal, producing a pedestal signal.

Figure 4:
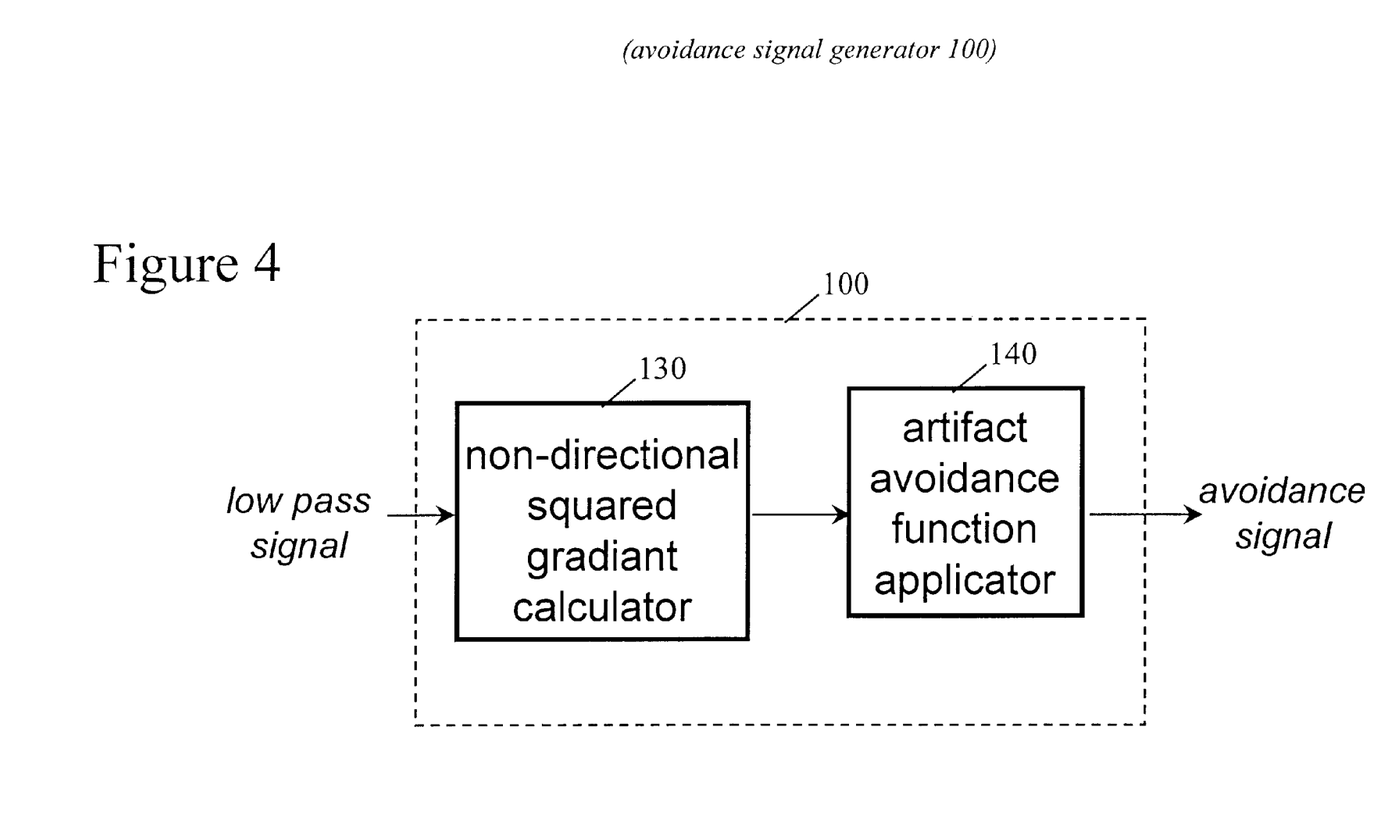
FIG. 4 is an exploded view of the avoidance signal generator of FIG. 3.

Referring to FIG. 4, there is illustrated an exploded block diagram of the avoidance signal generator 100. In this regard, the low pass signal is input into a non-directional squared gradient calculator 130 for producing a non-directional gradient signal. This calculation is performed by first calculating the difference between the pixel and its upper vertical neighbor, as well as the difference between the pixel and its horizontal neighbor to the right. The non-directional squared gradient is the sum of the squares of these two differences. The non-directional squared gradient signal is then mapped by an artifact avoidance function applicator 140 to produce an artifact avoidance signal as the output of the avoidance signal generator 100. This output signal of the avoidance signal generator 100 will from now on be referred to as a(L).

Figure 5:
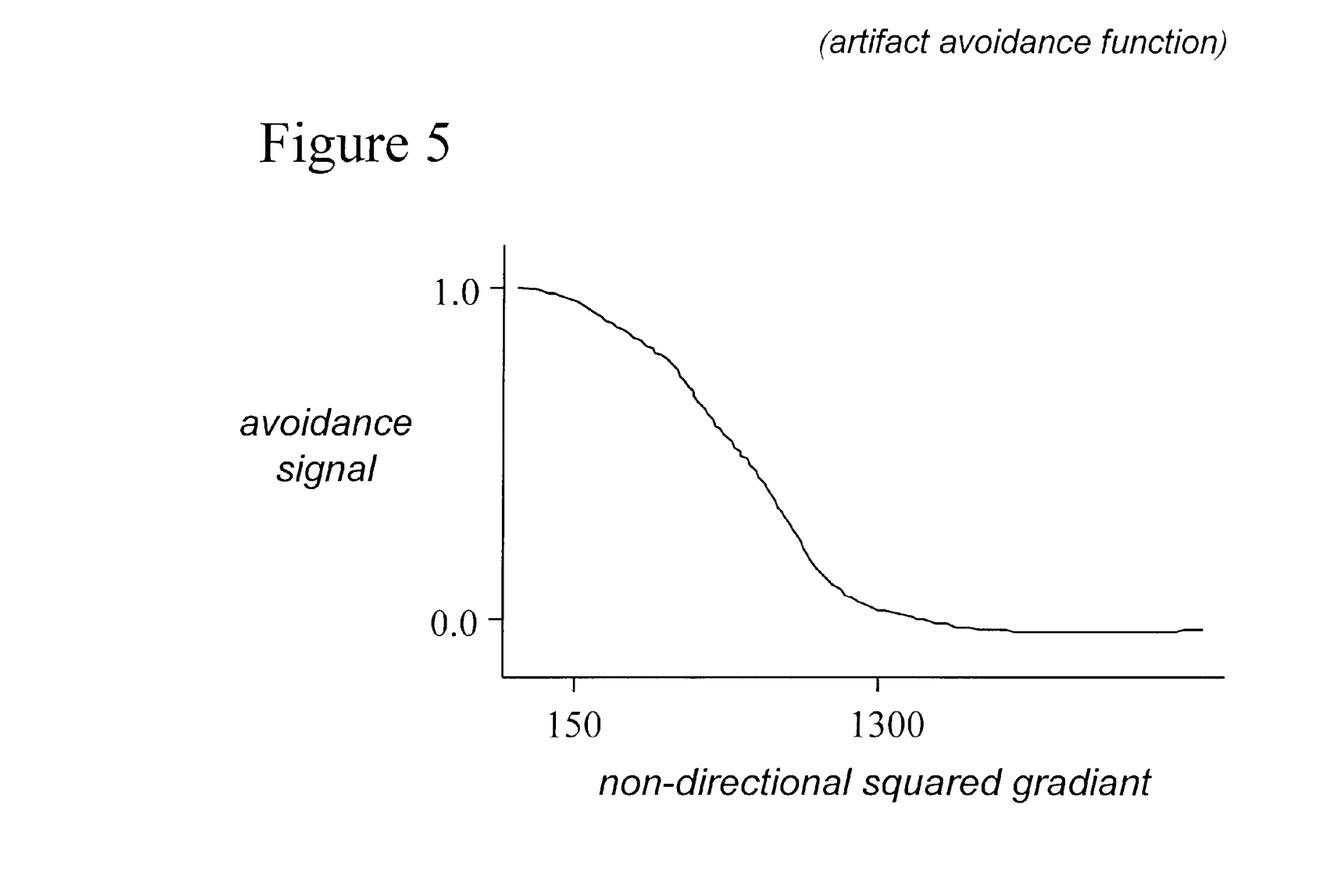
FIG. 5 is the artifact avoidance LUT.

Referring to FIG. 5, this mapping function is performed by passing the non-directional squared gradient signal, ndg (L), through an artifact avoidance function av( ) formed in the following manner. The preferred embodiment of the present invention utilizes an artifact avoidance function defined by:

$$av(L)=(½)(1+COS(\pi(L-N_o)/(N_1-N_o))$$

for $L>N_o$ and $y<N_1$, av(L)=0
for $L>=N_1$ and av(L)=1
for $L<=N_o$ where $N_o$ and $N_1$ are numerical constants and L represents the pixel value of the luminance signal.

The preferred values for $N_o$ and $N_1$ will vary according to the range of the input data. The input data range in the images used in the development of this preferred embodiment ranged from 0 to 4095. In this case, the preferred value for $N_o$ is 148, and the preferred value for $N_1$ is 1300. As an alternate method for constructing the artifact avoidance function is described in the following equation:

$$av(L)=1-sqrt((L-N_o)/(N_1-N_o))$$

$$av(L)=1-(L-N_o)/(N_1-N_o)$$

for $L>=N_o$ and $L<=N_1$, av(L)=1
for $L<N_o$, and av(L)=0
for $L>N_1$.

The artifact avoidance signal, a(L), is generated by the artifact avoidance function applicator 140. This is accomplished by applying the artifact avoidance function av( ) to the non-directional gradient signal ndg(L). The mathematical result is described by the equation:

$$a(L)=av(ndg(L)).$$

The artifact avoidance function is most efficiently implemented as a look-up-table (LUT).

A generalized linear spatial filter is described by the equation $$y_{ij}=\Sigma c_{mn}x_{mn},$$

where the $x_{mn}$ values represent local pixel values surrounding the $ij^{th}$ pixel and the $c_{mn}$ values represent numerical coefficients that do not depend on the pixel values $x_{mn}$. A non-linear spatial filter herein described shall be defined as a spatial filter which can not be described by the linear spatial filter equation. The output of applying a generalized control signal to an input signal bears a multiplicative relationship to the input signal. An example of applying a control signal is given by the equation:

$$y_{ij}=a_{ij}x_{ij},$$

where the $x_{ij}$ values represent the input signal $ij^{th}$ pixel values and the $a^{ij}$ values represent the $ij^{th}$ pixel values of the control signal. The result of applying a control signal to an input signal falls into the general category of a non-linear spatial filter if the control signal is derived from a spatial filtered version of the input signal. The avoidance signal a(L) is an example of a control signal created from a spatially filtered version of the luminance signal. The texture signal q(L) described in the preferred embodiment is an example of a non-linear spatial filter produced with the application of a control signal to the high-pass signal.

It should be noted that other methods of non-linear spatial filtering for the purposes of the application of the a tone scale function can be used for the present invention. The invention has been described with reference to a preferred embodiment. However, it will be appreciated that variations and modifications can be effected by a person of ordinary skill in the art without departing from the scope of the invention.

Figure 7:
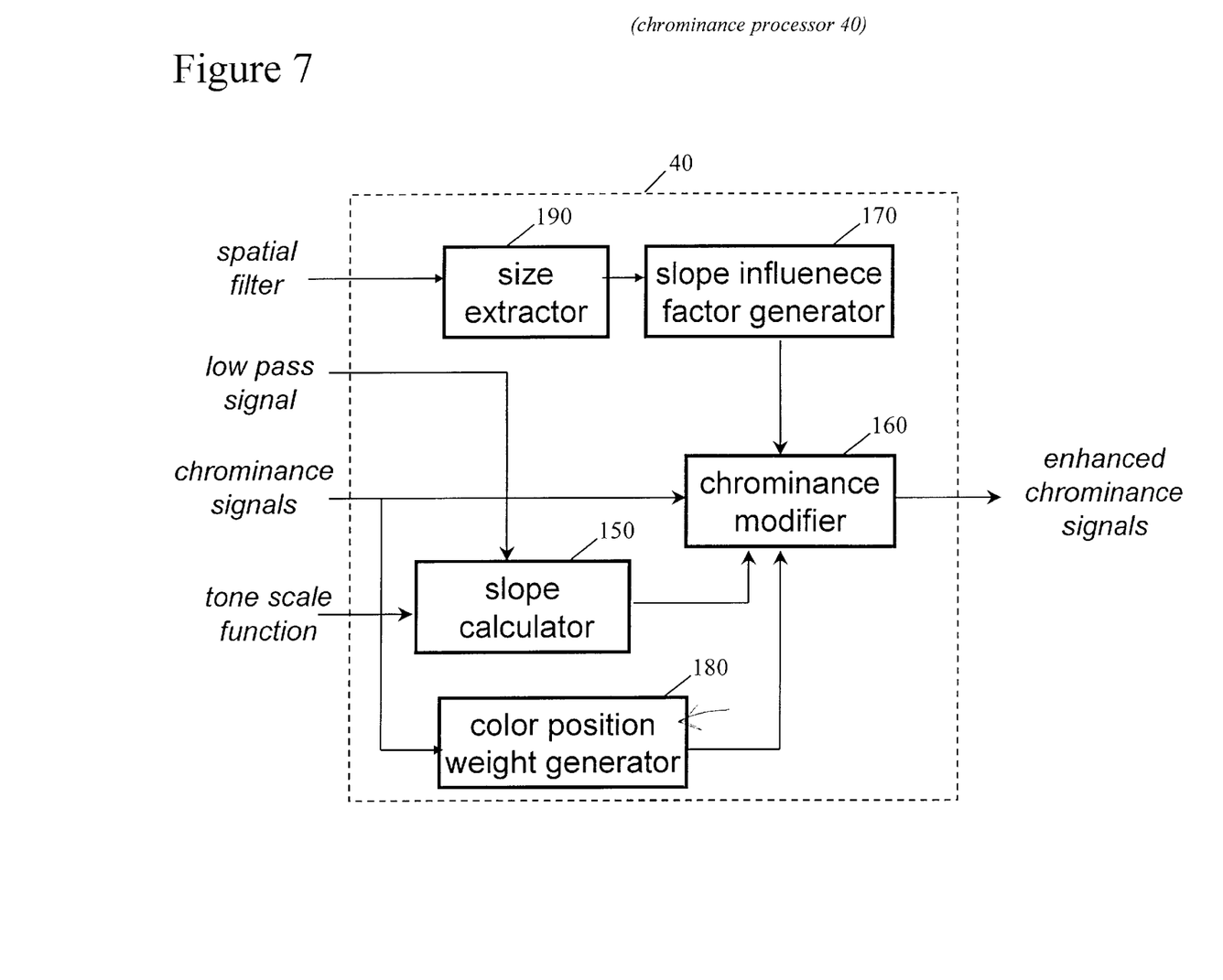
FIG. 7 is an exploded view of the chrominance processor for FIG. 1.

Referring to FIG. 7, therein is illustrated an exploded view of the chrominance processor 40 of FIG. 1. The input chrominance signals are passed into the chrominance modifier 160. The chrominance modifier 160 adjusts the relative color difference of each pixel in the input image in accordance with a provided tone scale function, as will be further described. It is necessary to note that the provided tone scale function may be implemented as a LUT, or may be the implied tonal response of a device that resides in the imaging chain. The output of the chrominance modifier 160 is a transformed color image with color difference signals modified to compensate for the tone scale function.

Again referring to FIG. 7, the tone scale function is input to the slope calculator 150 which differentiates the tone scale function to produce a local slope of the tone scale function, evaluated at the low pass signal level. The output of the slope calculator 150 is input to the chrominance modifier 160. Also input to the chrominance modifier 160 are the two chrominance signals $C_1$ and $C_2$ produced by the luminance/chrominance converter 10 of FIG. 1, the slope influence factor $\gamma_i$ as output from slope influence factor generator 170 of FIG. 7, and the color position weight, which will be described in detail below. The chrominance modifier 160 modifies the two chrominance signals to produce the enhanced chrominance signals which are sent to the RGB converter 30 of FIG. 1.

The slope calculator 150 of FIG. 7 performs the operation of calculating the derivative of the provided tone scale function. If f represents the tone scale function, then the slope function, represented by s, produced by the slope calculator 150 can be calculated with the following formula:

$$s(p)=(f(p+d)-f(p-d))/2d,$$

where p represents the input pixel value of the low pass luminance signal and d represents a small integer. The preferred embodiment uses a value of 5 for d. The above formula approximates the slope of the tone scale function f by evaluating the function f at a pixel value above and below the input pixel value p. The difference between these two function values divided by the spread in the evaluation values yield an average slope value for the tone scale function. The slope calculator 150 utilizes a LUT in order to generate the output of the slope calculator 150 from the input low pass signal.

Figure 10:
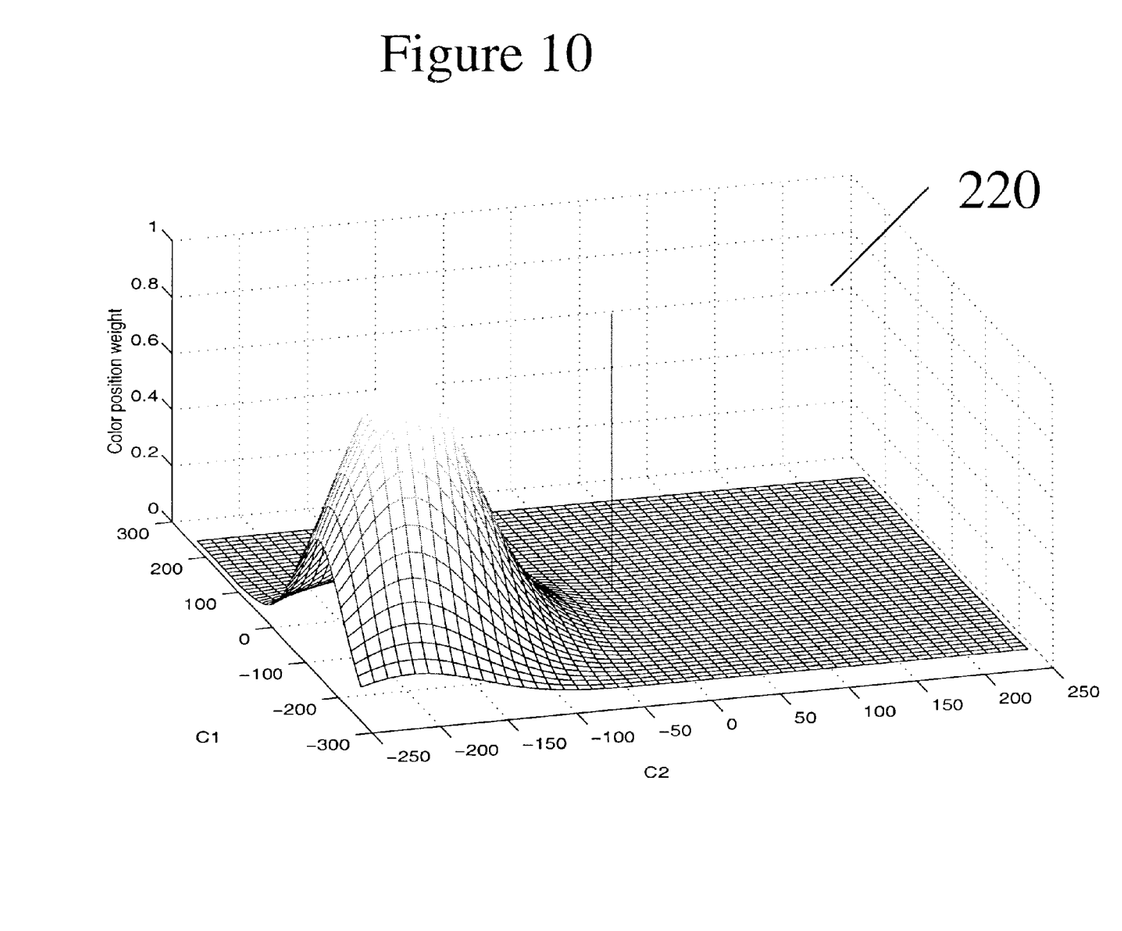

The chrominance signals are input to the color position weight generator 180. The color position weight generator 180 generates a color position weight K which allows the chrominance modifier 160 to tailor the treatment of a pixel's location in color space. In general, the value of the color position weight K ranges from 0.0 to 1.0. The color position weight K enables the method of the present invention to allow the calculation of the chrominance adjustment factor $H_i$ to vary based upon the color characteristics of the pixel. In general, K is a function of the luminance L and color difference $C_i$ values. FIG. 10 illustrates the use of a two-dimensional LUT 220 as a method of determining the value of K for each pixel. As shown in FIG. 10, the value of the color position weight K is shown to be dependent upon the color differences $C_i$. The value of the color position weight K shown in FIG. 10 may also be derived analytically by the following mathematical formula:

$$K = \exp\left[\frac{-1}{2000}(0.23(C_1+95)^2 - 0.15(C_1+95)(C_2+170) + 0.36(C_2+170)^2)\right]$$

This formulation of the color position weight K allows the method of the present invention to adjust the color difference values of pixels that are colored similarly to human flesh (K~1.0), but preserve the original color difference values for pixels that are colored differently than human flesh (K~0.0). This embodiment has been found to be advantageous to avoid desaturation of saturated objects such as sky, while allowing for the required modifications to the color difference values of flesh color pixels.

Those skilled in the art will realize that the determination of a color position weight K may take many forms (such as introducing a luminance L value dependence into the determination of the color position weight K) without significantly deviating from the scope of the present invention.

Figure 9:
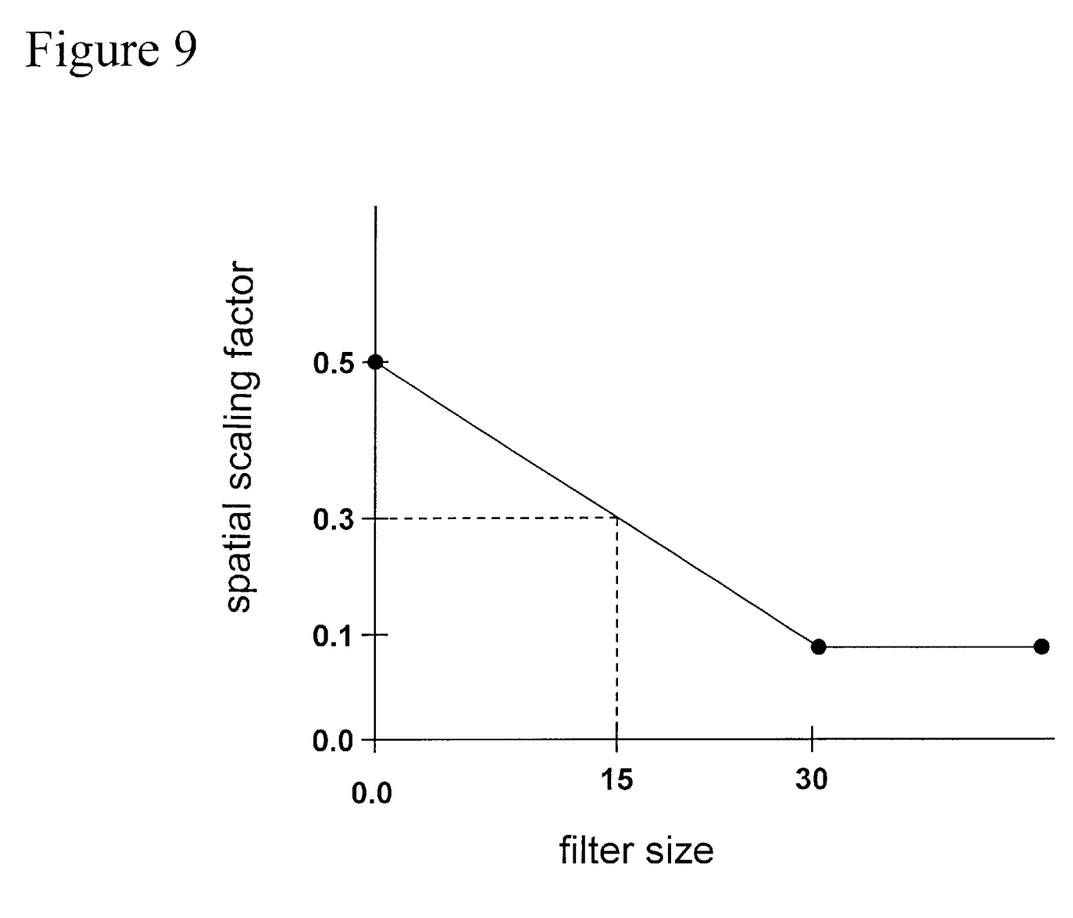
FIG. 9 is an example look-up-table used in the slope influence factor generator of FIG. 7; and, FIG. 10 is an example color position weight look-up-table used in the color position weight generator of FIG. 7.

In the preferred embodiment, it has been observed that the frequency split of the low pass filter used in the tone scale processor 20 has a great deal of influence over the preferred setting of the slope influence factor $\gamma_1$ used in the chrominance processor 40. In order to coordinate the effects of the tone scale processor 20 and the chrominance processor 40, the following method is implemented. Referring to FIG. 7, the spatial filter used in the tone scale processor 20 is input to the chrominance processor 40. The spatial filter is input to the size extractor 190. The output of the size extractor 190 is the number of pixels the spatial filter measures. For example, in the preferred embodiment, the spatial filter is a Gaussian filter with standard deviation of 2.5 pixels. As a rule of thumb, a Gaussian filter samples plus and minus 3 standard deviations. Thus, the size of the filter is 15 pixels by 15 pixels. Therefore, if the spatial filter of the preferred embodiment is passed to the size extractor 190, the output of the size extractor is 15 pixels. The output of the size extractor 190 is passed to the slope influence factor generator 170. The slope influence factor generator 170 generates an appropriate value for the slope influence factor $\gamma_i$. This is accomplished by the use of a LUT, as illustrated by FIG. 9. In this case, the LUT may be described by the following equations:

$\gamma_i(z) = \frac{1}{2} - z/75$ for $0 <= z <= 30$, $\gamma_i(z) = 0.1$ for $z > 30$.

Where:
$\gamma_i(z)$ = slope influence factor, and,
z = output of size extractor 190.
This relationship was chosen such that the larger the filter used in the tone scale processor 20, the less alteration is performed on the color difference channels $C_1$. The optimal setting for the slope influence factor $\gamma_i$ is set to a value of 0.3 based on the 15 pixel size filter. The minimum value of the slope influence factor $\gamma_i$ was determined to be 0.1 based on experimentation with larger filter sizes. The maximum value of the slope influence factor $\gamma_i$ was determined to be 0.5 based on experimentation of applying tone scale functions with no spatial filtering methods.

Figure 8:
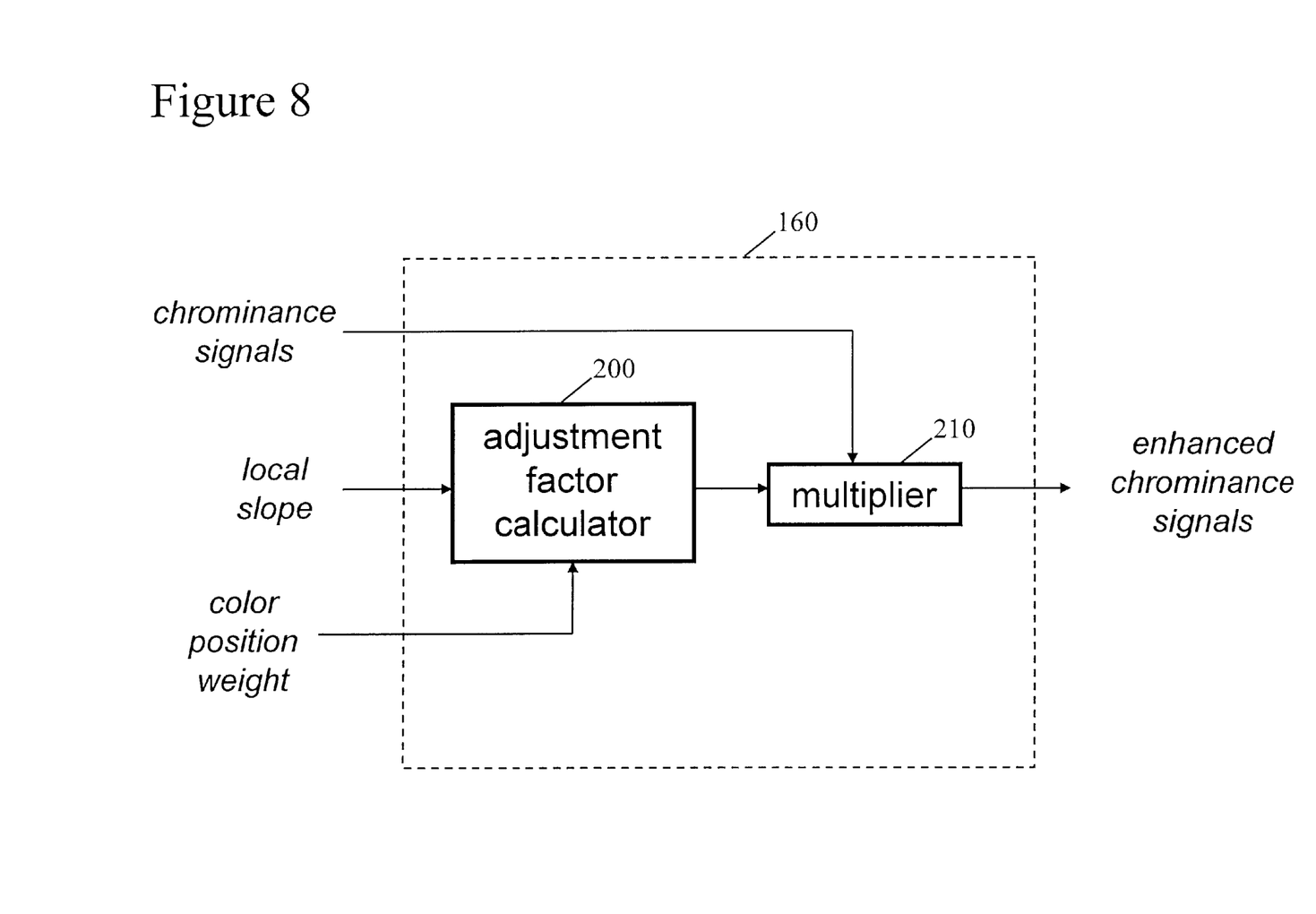
FIG. 8 is an exploded view of the chrominance modifier for FIG. 7.

The chrominance modifier 160 accepts as inputs the slope influence factor generated by the slope influence factor generator 170, the chrominance signals, the local slope output from the slope calculator 150, and the color position weight output from the color position weight generator 180. FIG. 8 illustrates an exploded view of the chrominance modifier 160. The adjustment factor calculator 200 computes the chrominance adjustment factor $H_i$. In the preferred embodiment, the method for calculating the chrominance adjustment factor $H_i$ may be described with the following formula:

$$H_i = K\gamma_i(s-s_o) + s_o.$$

Where:
K = color position weight; and,
$\gamma_i$ = slope influence factor. This parameter typically ranges from 0 to 1.0.

The calculated local slope, represented by s, is output from the slope calculator 150. The nominal slope constant, represented by $s_o$ is set to a value of 1.0 in the preferred embodiment.

Again referring to FIG. 8, the output of the adjustment factor calculator 200 is passed to the multiplier 210. The purpose of the multiplier 210 is to scale each of the color difference signals by the output of the adjustment factor calculator 200. The scaled color difference signals that are the output of the multiplier 210 are hereafter referred to as the compensated chrominance signals. That is:

$$C_{pi} = C_i * H_i \text{ For } i=1,2 \ldots$$

Where:
$C_{pi}$ = the output of multiplier 210. i.e. compensated chrominance signal;
$C_i$ = chrominance signals, and,
$H_i$ = output of chrominance adjustment factor calculator 200.

What is claimed is:
1. A method for preserving spatial detail and color content when adjusting tone scale of a digital color image, the method comprising:
    (a) providing a tone scale function for adjusting the tone scale of the digital color image;
    (b) providing a spatial filter for adjusting the tone scale of the digital color image;
    (c) transforming the digital color image into a luminance signal and chrominance signals;
    (d) using the tone scale function, the spatial filter, and the luminance signal to produce an enhanced luminance signal;
    (e) using the tone scale function, the spatial filter, the luminance signal, and the chrominance signals to produce enhanced chrominance signals; and
    (f) producing an enhanced digital color image from the enhanced luminance signal and the enhanced chrominance signals.
2. The method as in claim 1 wherein step (d) further includes creating a control signal from a spatially filtered version of the luminance signal.

3. The method as in claim 2, wherein step (d) further includes generating a high pass and a low pass signal; wherein step (d) includes generating at least two non-linear spatial filtered versions of the digital image channel from the high pass signal, the low pass signal, the control signal, and the luminance signal.

4. The method as in claim 3, wherein step (d) further includes generating an enhanced luminance signal by the application of the tone scale function to one of the non-linear spatial filtered signal versions of the luminance signal.

5. The method as in claim 4, wherein step (d) further includes generating an enhanced luminance signal by the application of the tone scale function to one of the non-linear spatial filtered signal versions of the luminance signal, and modifying the remaining non-linear spatial filtered signal.

6. The method as in claim 5 wherein step (e) further includes calculating a chrominance adjustment factor based on the size of the spatial filter.

7. The method as in claim 6 wherein step (e) further includes calculating a local slope of the tone scale function.

8. The method as in claim 7 wherein step (e) further includes calculating a color position weight factor.

9. The method as in claim 1 wherein step (e) further includes calculating a chrominance adjustment factor based on the size of the spatial filter.

10. The method as in claim 9 wherein step (e) further includes calculating a local slope of the tone scale function.

11. The method as in claim 10 wherein step (e) further includes calculating a color position weight factor.

12. A method for preserving spatial detail and color content when adjusting tone scale of a digital color image, the method comprising:
  a) providing a tone scale function for adjusting the tone scale of the digital color image;
  b) providing a spatial filter for adjusting the tone scale of the digital color image;
  c) transforming the digital color image into a luminance and chrominance signals;
  d) using the tone scale function, the spatial filter, and the luminance signal to produce an enhanced luminance signal;
  e) calculating a local slope of the tone scale function;
  f) calculating a chrominance adjustment factor based on the local slope; and
  g) producing enhanced chrominance signals from the chrominance signals and the chrominance adjustment factor.

* * * * *